Jan. 10, 1933.  J. C. SLONNEGER  1,894,130
CUTTING APPARATUS FOR MOWERS
Filed Dec. 15, 1930   2 Sheets-Sheet 1
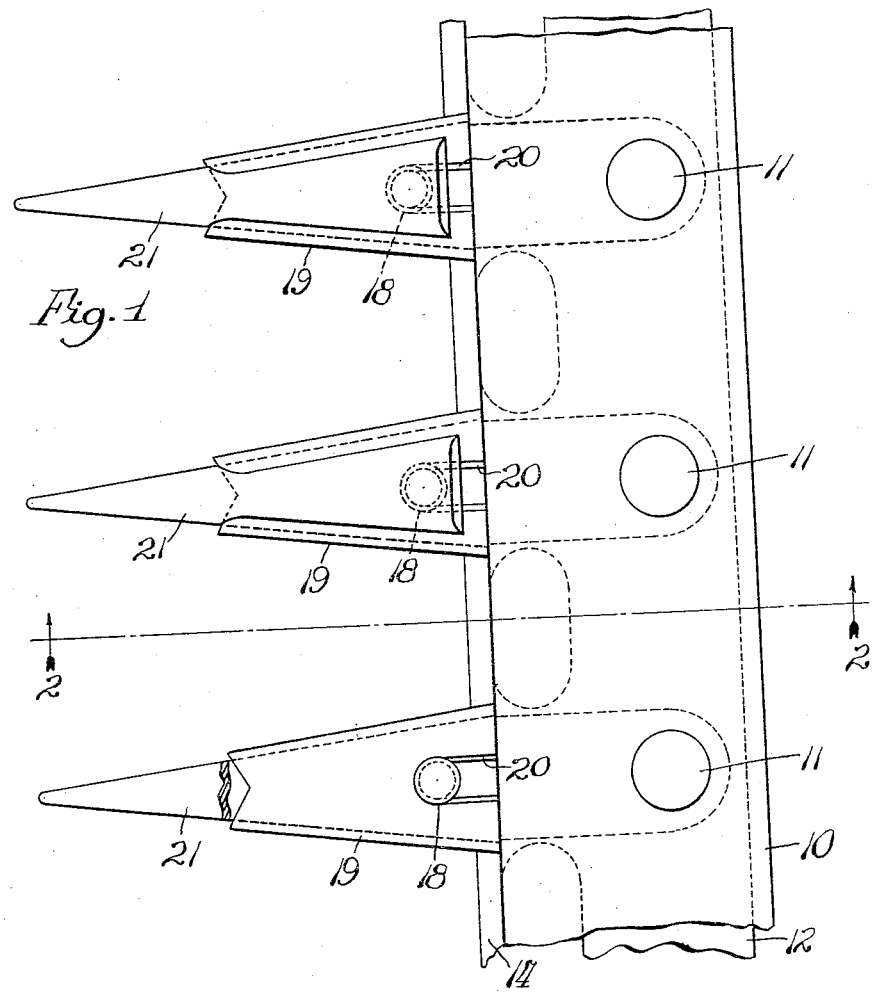
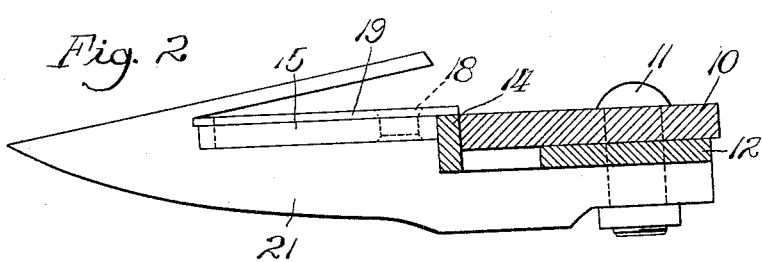

Jan. 10, 1933.　　　J. C. SLONNEGER　　　1,894,130
CUTTING APPARATUS FOR MOWERS
Filed Dec. 15, 1930　　　2 Sheets-Sheet 2
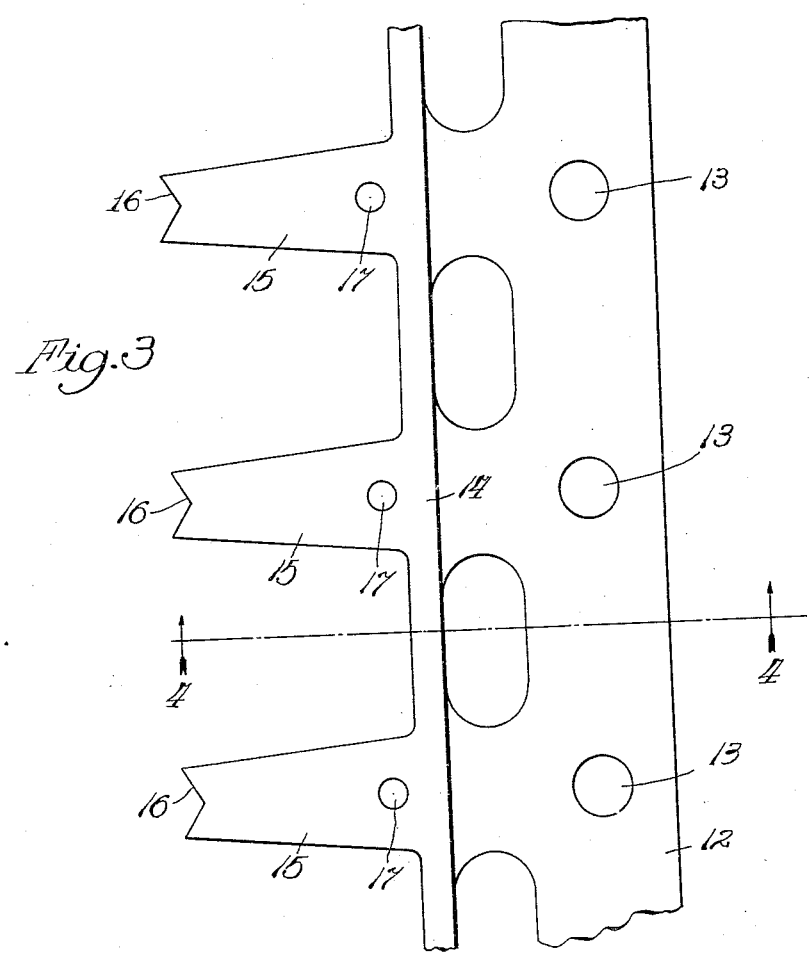
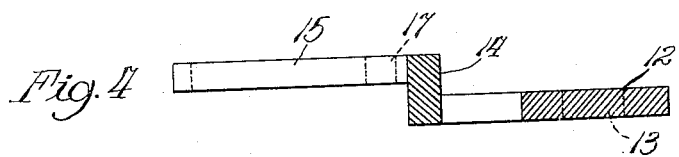
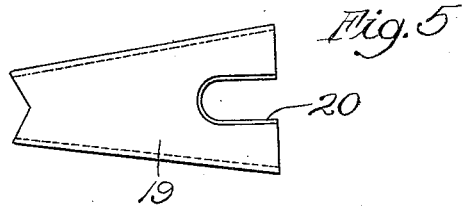
Inventor.
John C. Slonneger
By N. P. Doolittle
Atty.

Patented Jan. 10, 1933

1,894,130

UNITED STATES PATENT OFFICE

JOHN C. SLONNEGER, OF MILWAUKEE, WISCONSIN, ASSIGNOR TO INTERNATIONAL HARVESTER COMPANY, A CORPORATION OF NEW JERSEY

CUTTING APPARATUS FOR MOWERS

Application filed December 15, 1930. Serial No. 502,363.

The invention is in a mower and particularly relates to an improved form of cutting mechanism therefor.

In standard cutting apparatus, the cutter bar carries a plurality of spaced finger guards, each of said guards carrying removable ledger plates which constitute the stationary shear member which cooperates with the reciprocable sickle moving through slotted ways in each of the guard fingers. In such standard construction the ledger plates are difficult to line up so as to cooperate in the best manner with the reciprocatory sickle and, further, the guards are subjected in use to the cutting force, which sometimes results in damage to the guards.

The object of the present invention is to provide an improved structure which permits the quick removal and replacement of such ledger plates.

A further object is to provide for accurate alignment of the ledger plates whereby the cutting action is effectively maintained.

A further object of the invention is to provide a means of interchanging guards without removing or affecting the alignment of the ledger plates.

A further object is to provide for the alignment of the ledger plates independently of the guards and to relieve the guards from all cutting forces.

A still further object of the invention is to provide a cutting mechanism of the kind stated, the parts of which can be accurately and economically manufactured.

In carrying out the invention, briefly, a formed ledger plate carrier is employed, locating two or more guards and ledger plates, at the discretion of the designer, said ledger plate carrier being secured to the cutter bar by the bolts which also secure the guards. Thus, by securing the bolt, the guard is rigidly secured to the ledger plate carrier, which in turn secures the ledger plate rigidly to the ledger plate carrier, but in no way affects the alignment of the ledger plates, as they are always maintained in parallelism with the cutter bar. This disposition of the parts is such that the cutting forces are absorbed by the ledger plate carrier.

In the accompanying sheets of drawings illustrating one practicable embodiment which this invention may assume in practice,—

Figure 1 shows a plan view of a section of the improved cutting mechanism;

Figure 2 is a cross sectional view, as seen along the line 2—2 appearing in Figure 1 when looking in the direction of the arrows;

Figure 3 is a plan view showing a portion of the ledger plate carrier;

Figure 4 is a cross sectional view through the ledger plate carrier, as seen along the line 4—4 shown in Figure 3 when viewed in the indicated direction; and, Figure 5 is a plan view of a ledger plate.

As best shown in Figures 1 and 2, the conventional cutter bar of the mower appears at 10, the same being formed at intervals with the usual holes for receiving bolts 11. These bolts 11 are used for securing to the bar 10 the improved ledger plate carrier shown in Figure 3, which comprises a main flat portion 12 having holes 13, through which the bolts 11 pass. This portion 12 may be skeletonized, as shown in Figure 3, to save metal and to make the same as light as possible. The portion 12 carries a continuous vertical wall 14 which merges with forwardly extending flat ledger plate supports 15, which are spaced apart at intervals, as shown in Figure 3, to conform with the spacing of the guard fingers. Each of these ledger extensions 15 has a notched forward end 16 and is provided at its rear with an opening 17, which openings 17 carry rivets 18 for fastening ledger plates 19, as shown in Figure 5, to the carrier portions 15 in the manner shown in Figure 1. This mounting of the ledger is accomplished by the slot 20 in the plate 19, which slot 20 embraces the rivet 18, as shown in Figure 1.

The finger guards are shown at 21 and are of standard construction, the same having holes at their heel portions through which the bolts 11 pass. The reciprocatory sickle, not shown, operates across and cooperates with the ledgers 19 to produce the shearing action.

In assembling this improved cutting apparatus, the flat portion 12 of the ledger plate carrying member is arranged underneath the cutter bar 10, as shown in Figure 2, the ledger plates 19 having first been secured in place on the ledger supports 15. Then the guard fingers 21 are brought into position, as shown in Figure 2, and the bolts 11 fasten the parts together to complete the assembly.

It will be noted that when the parts are so assembled the upper horizontal surface of each of the extensions 15 lies in the same horizontal plane with the upper surface of the cutter bar 10.

The ledger plate carrying member of Figure 3 can be formed as a continuous length, or may be formed in separate sections, as may be desired.

In operation it must be clear that as the ledger plates 19 are carried on the supporting portions 15 as an integral part of the ledger member 12, it necessarily follows that the ledger plates 19 are in accurate alignment crosswise and in parallelism with the cutter bar 10. Further, the entire forces developed in the cutting operation are absorbed by the blanked member 12, which is very strong and well able to take such shocks, thus relieving the guard fingers 21 of all cutting forces. This is a very desirable feature, as it saves the guard fingers from breakage. If a guard finger should be broken for some other reason, it can easily be removed without interfering with the ledgers 19 and in any way changing their alignment.

From this detailed disclosure it must now be apparent that an improved structure results, which achieves all of the desirable objects heretofore recited.

It is the intention herein to cover all such changes and modifications which do not depart in material respects from the spirit and scope of this invention which have been expressed in the appended claims.

What is claimed is:

1. A cutting apparatus for mowers, said apparatus comprising a cutter bar, a ledger plate support connected to the bar, said support embodying forward extensions, ledger plates having the same profile as the extensions removably secured to said extensions, and guard fingers removably secured to said bar in cooperative relationship with the extension supported ledger plates.

2. In combination, a cutter bar, guard fingers, a ledger plate carrying member having a portion thereof underlying the cutter bar, said member having integrally formed extensions in spaced relation therealong and extending from the member forwardly of the cutter bar, ledger plates of the same profile as the extensions secured to said extensions and held in place independently of the guard fingers, said guard fingers, bar and member being formed with registering openings, and fastening means passed through registered openings to secure each guard finger to the bar in proper cooperative position relative to its respective ledger plate.

3. In combination, a cutter bar, guard fingers connected to the cutter bar, an integrally formed ledger plate support member including a portion underlying the cutter bar and raised forward extensions disposed in spaced relation and having their upper surfaces lying in the horizontal plane of the upper surface of the cutter bar, ledger plates removably secured to the extensions whereby to mount the ledger plates independently of the guard fingers, and means for removably securing each guard finger to the underside of the portion of the ledger plate support member underlying the cutter bar, said securing means being passed through registered openings in the guard fingers, the support member and the cutter bar.

In testimony whereof I affix my signature.

JOHN C. SLONNEGER.